No. 856,634. PATENTED JUNE 11, 1907.
F. J. & H. J. HANSEN.
BALL BEARING WHEEL.
APPLICATION FILED DEC. 17, 1906.

Witnesses,

Inventors
Frank J. Hansen.
Hans J. Hansen.
By their Attorneys.

UNITED STATES PATENT OFFICE.

FRANK J. HANSEN AND HANS J. HANSEN, OF MINNEAPOLIS, MINNESOTA.

BALL-BEARING WHEEL.

No. 856,634.  Specification of Letters Patent.  Patented June 11, 1907.

Application filed December 17, 1906. Serial No. 348,238.

*To all whom it may concern:*

Be it known that we, FRANK J. HANSEN and HANS J. HANSEN, citizens of the United States, residing at Minneapolis, in the county of Hennepin and State of Minnesota, have invented certain new and useful Improvements in Ball-Bearing Wheels; and we do hereby declare the following to be a full, clear, and exact description of the invention, such as will enable others skilled in the art to which it appertains to make and use the same.

Our invention has for its object to provide an improved ball bearing wheel and axle, especially adapted for use on what is generally known to the trade as "gravity carriers" or conveyers, and to this end it consists of the novel devices and combinations of devices hereinafter described and defined in the claims.

The invention is illustrated in the accompanying drawings, wherein like characters indicate like parts throughout the several views.

Figure 1:
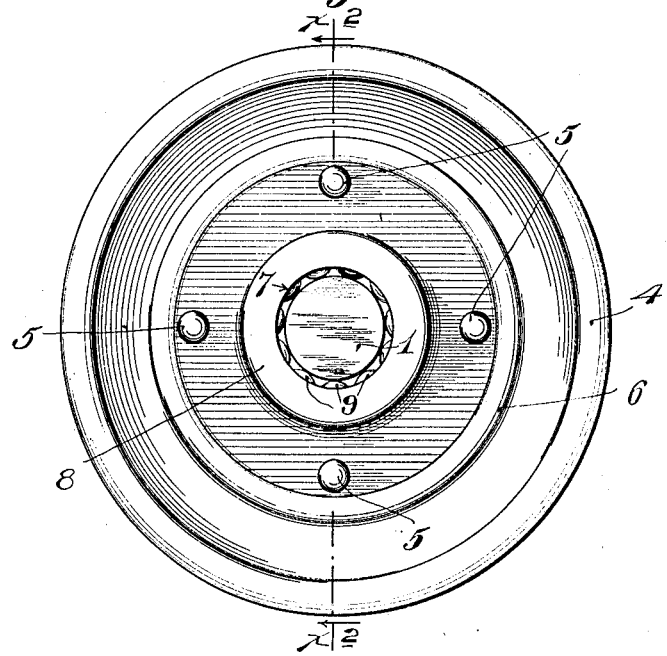
Figure 2:
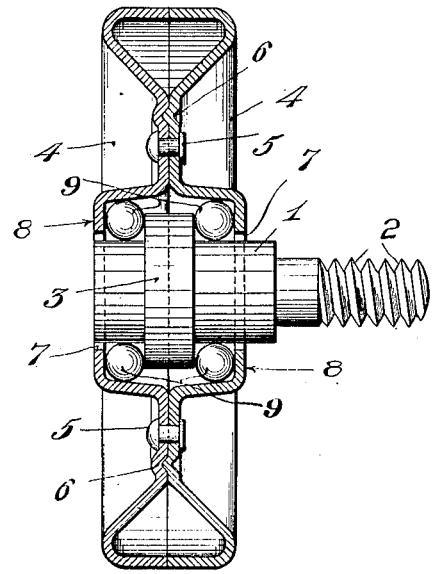

Referring to the drawings, Figure 1 is a view in side elevation, showing the improved wheel and axle; and Fig. 2 is a section taken through the wheel on the line $x^2 x^2$ of Fig. 1, the axle being shown in full.

The numeral 1 indicates an axle which, as shown, is in the form of a short trunnion having a threaded end 2 which is adapted to be screwed into a suitable body or support (not shown). This axle 1, at its intermediate portion, is provided with an annular flange or fixed peripheral collar 3.

The wheel is made up of two similar and approximately reverse sections 4 that are preferably rigidly secured together by rivets 5 and are provided with an annular lock joint 6 formed by an annular flange on the one member that engages a corresponding groove in the other member. Outward of the joint 6, the wheel members 4 diverge outward from each other and are then bent upon themselves inward and brought into close engagement at their outer edges to form the rim of the wheel. The inner portions of said wheel members 4 are perforated at 7 to clear the axle 1, and just inward of said perforations they are bulged outward then extended parallel to each other to form ball runways 8 on the opposite sides of the flange or collar 3 of the axle. Bearing balls 9, of which there are two series, work between the ball runways 8 of the wheel, and the axle 1 and vertical edges of the collar or flange 3 of said axle. It will thus be seen that the balls 9 have two points of contact with the axle and two points of contact with the hub of the wheel, and it is very important to note that one series of bearing balls is located on each side of a plane that intersects the center of the wheel at an angle of 90 degrees to its axis. This disposition of the two series of bearing balls 9 gives great lateral stability to the wheel and, furthermore, distributes the strain on a very large number of balls. The joint 6 axially alines the wheel sections 4.

It is, of course, evident that when the two sections of the wheel are secured together, the bearing balls are irremovably held in working positions. If desired, of course, screws or bolts might be substituted for the rivets 5, in which case the sections of the wheel could be more easily taken apart.

When the wheel is applied to the track of a gravity conveyer, the axles 1 or rather the threaded ends thereof, would be screwed into the track rails or other parts rigid with respect to the track. When the said wheel is applied to a traveling carrier such as a truck, the said axle should, of course, be secured to such moving body. The so-called wheel might, of course, be treated as a pulley and might serve the function of a pulley or sheave.

The device described, while of small cost and easily constructed, is very efficient for the purposes had in view. The wheel sections 4 are preferably stamped by dies from sheets of steel.

What we claim is:

1. A wheel made up of two sections 4 rigidly united at their intermediate portions, the inner portions of said sections being pressed outward at 8 to form ball runways, and the outer portions thereof being pressed outward and then turned inward to form the rim of the wheel, substantially as described.

2. The combination with an axle having an intermediate collar or annular flange, of a wheel made up of two wheel sections 4 rigidly connected at their intermediate portions, provided with reversely bulged rim-forming portions and with reversely bulged ball runways in its hub portion, and bearing balls interposed between said axle and the ball runways of the hub of said wheel, substantially as described.

In testimony whereof we affix our signatures in presence of two witnesses.

FRANK J. HANSEN.
HANS J. HANSEN.

Witnesses:
 MALIE HOEL,
 F. D. MERCHANT.